(12) United States Patent
Jo

(10) Patent No.: US 7,661,884 B2
(45) Date of Patent: Feb. 16, 2010

(54) ROLLER APPARATUS

(75) Inventor: Yong-kon Jo, Suwon-si (KR)

(73) Assignee: Sansung Electronics Co., Ltd., Suwon-si (KR)

(*) Notice: Subject to any disclaimer, the term of this patent is extended or adjusted under 35 U.S.C. 154(b) by 520 days.

(21) Appl. No.: 11/532,998

(22) Filed: Sep. 19, 2006

(65) Prior Publication Data

US 2007/0071380 A1 Mar. 29, 2007

(30) Foreign Application Priority Data

Sep. 26, 2005 (KR) .................... 10-2005-0089496

(51) Int. Cl.
*F16C 17/24* (2006.01)
*H01R 4/66* (2006.01)
*H05F 3/02* (2006.01)

(52) U.S. Cl. .............. 384/277; 384/295; 384/624; 439/92; 361/221

(58) Field of Classification Search ............ 384/624, 384/476, 277, 276, 295; 361/220, 221; 439/92, 439/13, 18, 28, 29
See application file for complete search history.

(56) References Cited

U.S. PATENT DOCUMENTS

| | | | | |
|---|---|---|---|---|
| 1,787,188 A | * | 12/1930 | Chapman | 361/213 |
| 3,899,795 A | * | 8/1975 | Watanabe | 360/137 |
| 4,964,015 A | * | 10/1990 | Crooker et al. | 361/220 |
| 5,283,621 A | * | 2/1994 | Hashizume | 384/276 |

FOREIGN PATENT DOCUMENTS

| | | |
|---|---|---|
| JP | 9-297499 | 11/1997 |
| JP | 2001-356638 | 12/2001 |
| JP | 2003-5582 | 1/2003 |
| KR | 1998-28149 | 8/1998 |

* cited by examiner

*Primary Examiner*—Thomas R Hannon
(74) *Attorney, Agent, or Firm*—Stanzione & Kim LLP

(57) ABSTRACT

A roller apparatus includes a rotating roller, a bushing frictionally supporting the rotating roller, a frame having a bushing hole into which a bushing is inserted and supporting the bushing, and a grounding member interposed between the bushing and the frame and grounding the bushing by press contacting with the bushing when the bushing is inserted into the bushing hole. Thus, the roller apparatus effectively grounds a bushing.

22 Claims, 3 Drawing Sheets

ROLLER APPARATUS

CROSS-REFERENCE TO RELATED APPLICATIONS

This application claims priority from Korean Patent Application No. 2005-0089496, filed on Sep. 26, 2005, in the Korean Intellectual Property Office, the disclosure of which is incorporated in its entirety herein by reference.

BACKGROUND OF THE INVENTION

1. Field of the Invention

The present general inventive concept relates to a roller apparatus, and more particularly, to a roller apparatus to effectively ground a bushing thereof.

2. Description of the Related Art

In general, a roller apparatus has a roller main body of a cylindrical shape. The roller mail body rotates around a centering line and feeds object media in a tangential direction of the roller main body by a frictional force between the object media and the roller main body.

FIG. 1 is a schematic view illustrating a conventional roller apparatus 101. As illustrated in FIG. 1, the roller apparatus 101 has a roller 110, a frame 130, a bushing 120 and a grounding member 140. The roller 110 is frictionally supported on the bushing 120, and the frame 130 has a bushing hole 132 through which the bushing 120 passes. The frame 130 has a reinforcement part 136 extended around the bushing 120 to an axial direction P of the roller 110 and a supporting rib 134 spaced from the reinforcement part 136 and extended to the axial direction of the roller 110. The bushing 120 is inserted into the bushing hole 132 to rotatably support the roller 110.

The grounding member 140 grounds the bushing 120 by contacting the bushing 120. The grounding member 140 is connected with a grounding terminal (not shown). As the roller 110 frictionally contacts the bushing 120, the roller 110 makes friction with the bushing 120 to create static electricity between the roller 110 and the bushing 120 as the roller 110 rotates. The grounding member 140 prevents damage or malfunction of the roller apparatus 101 due to static electricity by grounding the bushing 120.

The grounding member 140 is formed of an elastic material. A first side of the member 140 is interposed between the bushing 120 and the reinforcement part 136 of the frame 130, and a second side of the member 140 is positioned to be pressed by the supporting rib 134. As the second side of the grounding member 140 is pressed to the axial direction P by the supporting rib 134, the first side of the grounding member 140 is elastically deformed to contact the bushing 120.

However, because in the conventional roller apparatus 101, the grounding member 140 is pressed by the supporting rib 134 and contacts the bushing 120 by the elastic force, a contact area with respect to the bushing 120 is small, and a contact force lowers, which requires high precision molding. If the elastic force of the grounding member 140 lowers, the supporting rib 134, the frame 130 or the bushing 120 is deformed thermally because of temperature or fatigue, and then the bushing 120 and the reinforcement 136 are separated such that the grounding member 140 may not contact the bushing 120.

Also, as the grounding member 140 is pressed to the axial direction P by the supporting rib 134, the bushing 120 is displaced toward the axial direction P, and accordingly, a position of the roller 110 may change.

SUMMARY OF THE INVENTION

Accordingly, the present general inventive concept provides a roller apparatus to effectively ground a bushing thereof.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept maybe achieved by providing a roller apparatus comprising a rotating roller, a bushing to frictionally support the rotating roller, a frame having a bushing hole into which the bushing is inserted and to support the bushing, and a grounding member interposed between the bushing and the frame and to ground the bushing by press-contacting the bushing when the bushing is inserted into the bushing hole.

The grounding member may comprise a first contact part inclinedly extended in the bushing hole with a first angle with respect to an axial direction of the rotating roller toward the bushing and pressed by an external side of the bushing to have a second angle less than the first angle with respect to the axial direction when the bushing is inserted into the bushing hole.

The grounding member may include an end part extended from the first contact part to be bent toward the frame.

The bushing may have a main body to support the rotating roller, and a stopper extended from one side of the main body in a radial direction of the rotating roller, the first contact part to press-contact the main body, and the grounding member has a second contact part which is extended from the first contact part in the radial direction of the rotating roller to be interposed between the frame and the stopper and grounds the bushing by contacting the stopper.

The bushing may have a main body to support the rotating roller, and a stopper extended from one side of the main body in a radial direction of the rotating roller, the first contact part to press-contact the main body, and the grounding member may comprise a second contact part which is extended from the first contact part in the radial direction of the rotating roller to be interposed between the frame and the stopper and grounds the bushing by contacting the stopper.

The contact member may comprise an elastic material.

The foregoing and/or other aspects and utilities of the present general inventive concept may also be achieved by providing a roller apparatus, comprising a rotating roller, a frame having a surface to define a hole to accommodate the rotating roller, a bushing to be inserted around the rotating roller and to be inserted in the hole, and having a gap with the surface of the frame in a radial direction of the rotating roller, and a grounding member disposed in the gap between the frame and the bushing to ground the bushing to an external ground.

The foregoing and/or other aspects and utilities of the present general inventive concept may also be achieved by providing an image forming apparatus, comprising a rotating roller, a frame having a surface to define a hole in which the rotating roller rotates, a bushing inserted in the hole between the rotating roller and the surface of the frame to be stationary with respect to the frame to support the rotating roller, and a grounding member having a variable shape disposed in a gap between the bushing and the surface of the frame in a radial direction of the rotating roller.

It is to be understood that both the foregoing general description and the following detailed description are exemplary and explanatory and are intended to provide further explanation of the general inventive concept as claimed.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
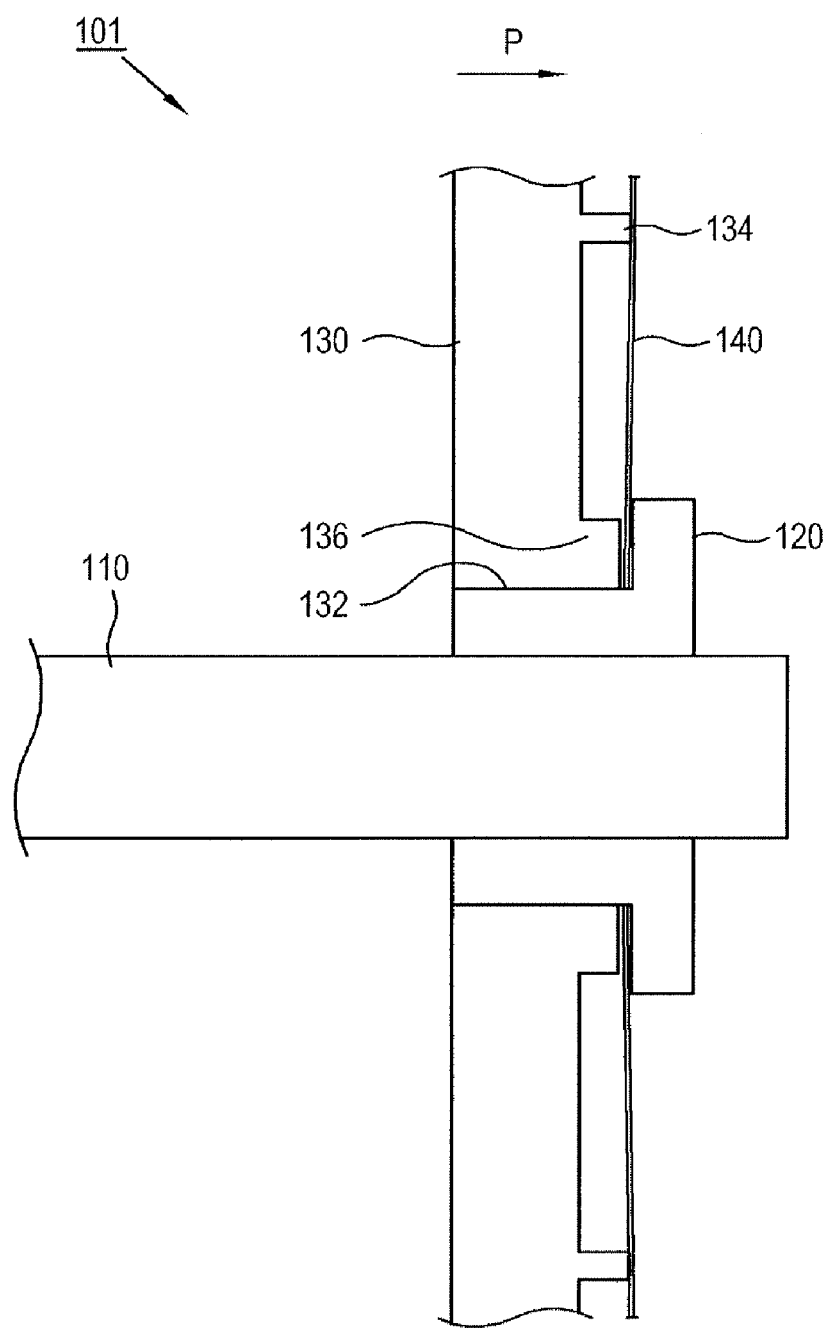
FIG. 1 is a schematic view illustrating a conventional roller apparatus.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
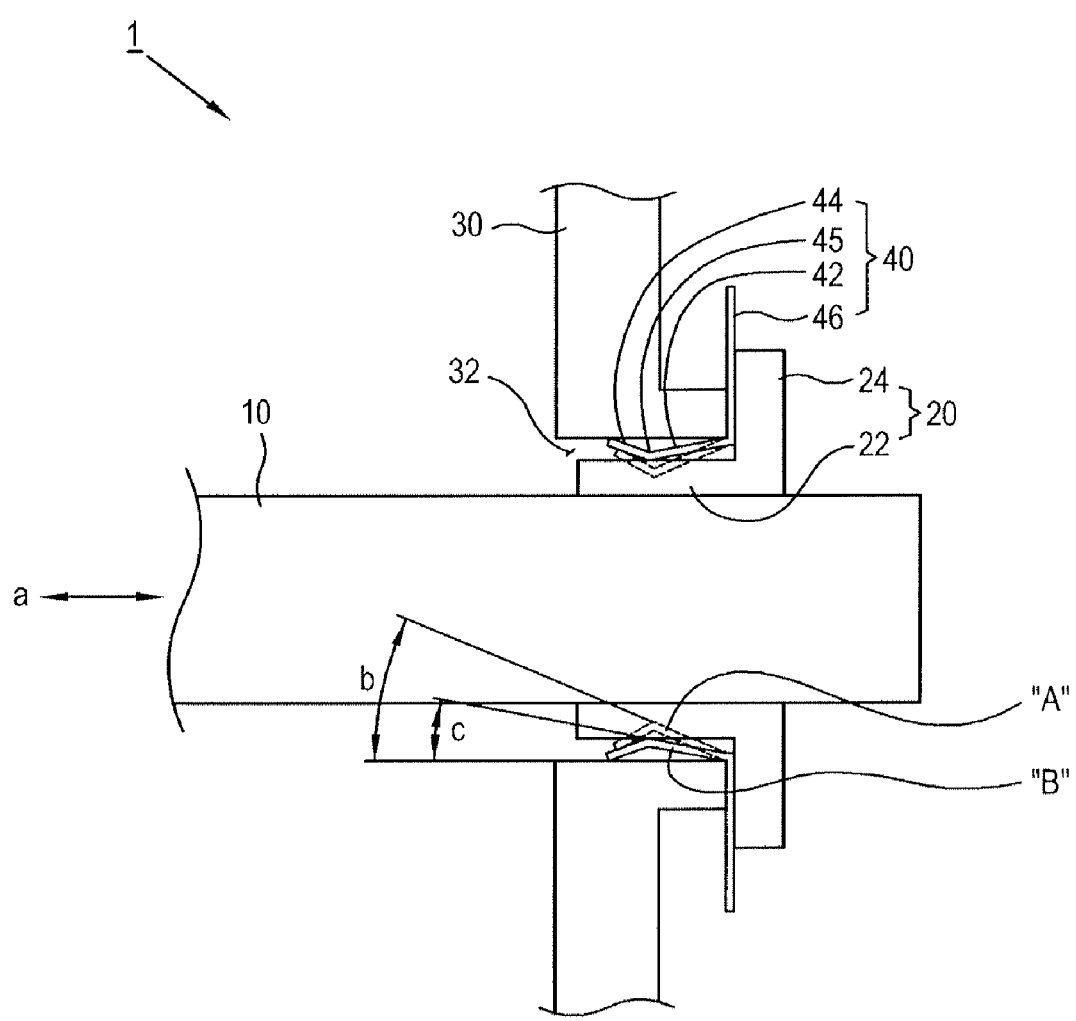
FIG. 2 is a schematic view illustrating a roller apparatus according to an embodiment of the present general inventive concept.
Figure 3:
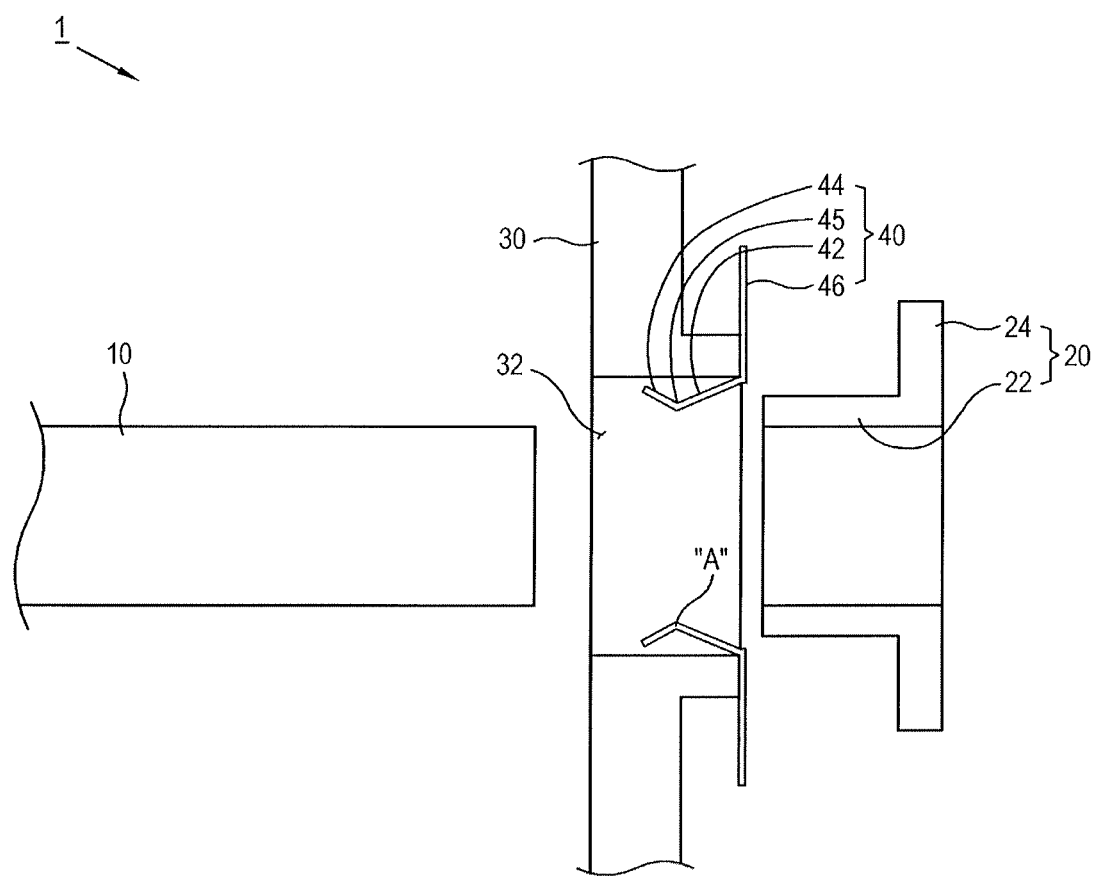
FIG. 3 is an exploded view illustrating the roller apparatus of FIG. 2.

FIG. 2 is a schematic view illustrating a roller apparatus 1 according to an embodiment of the present general inventive concept, and FIG. 3 is an exploded view illustrating the roller apparatus of FIG. 1.

As illustrated in FIGS. 2 and 3, the roller apparatus 1 comprises a rotating roller 10, a bushing 20 frictionally supporting the rotating roller 10, a frame 30 having a bushing hole 32 through which the bushing 20 passes and to support the bushing 20, and a grounding member 40 which is interposed between the bushing 20 and the frame 30, and pressedly contacts the bushing 20 to ground the bushing 20 when the bushing 20 is inserted into the bushing hole 32. The frame 30 includes a surface to define the bushing hole 32.

The rotating roller 10 performs predetermined functions by rotating around an axial line a. The rotating roller 10 may be a feeding roller which feeds an object or an information medium roller to generate or transfer information in an image forming apparatus, such as a photosensitive drum or a developer feeding roller. The rotating roller 10 may be a driving roller which is supplied with a driving power by a driving means (not shown) or an idle roller.

The bushing 20 frictionally supports the rotating roller 10 to rotate. The bushing 20 is formed in a cylindrical shape. An internal side of the bushing 20 supports the rotating roller 10, and an external side of the roller 10 supports the frame 30. The bushing 20 may comprise a conductive sintered metal bearing or a frictional shaft supporting member.

The bushing 20 comprises a main body 22 to support the rotating roller 10, and a stopper 24 radially extended from one side of the main body 22. The main body 22 of the bushing 20 may have the same length as a summation of a length of the surface of the frame 30 and a thickness of the grounding member 40 in the axial direction a. The main body 22 of the bushing 20 may have the same length as the surface of the frame 30 to define the bushing hole 32 in the axial direction a. An outer diameter of the stopper 24 is larger than a diameter of the bushing hole 32 to prevent the bushing 20 from moving from the bushing hole 32 in the axial direction a. The stopper 24 may be integrally formed with the main body 22 or may be detachably combined with the main body 22.

The frame 30 has the bushing hole 32 through which the bushing 20 passes. The bushing hole 32 is formed toward the axial direction a of the rotating roller 10. The bushing 20 is fitted into the bushing hole 32 not to rotate around the axial direction a. The bushing hole 32 may have a circular section a part of which is flat, and an external side of the bushing 20 is formed to correspond to the part of the bushing hole 32 to prevent the bushing 20 from rotating in the bushing hole 32. In addition, the frame 30 supports the bushing 20 not to rotate with respect to the frame 30. For example, the bushing hole 32 may have a groove part (not shown) formed in a radial direction, and the bushing 20 may have a projection part (not shown) extended to the radial direction to be combined with the groove part.

The grounding member 40 grounds static electricity generated by friction between the bushing 20 and the rotating roller 10. The grounding member 40 is connected with a predetermined grounding terminal (not shown). The grounding member 40 may be a housing (not shown) of the roller apparatus 1, a power supplying part (not shown), or an external grounding body. The grounding member 40 may be formed of a conductive material such as metal. Also, the grounding member 40 may be formed of an elastic material.

The grounding member 40 has a first contact part 42 and a second contact part 46. The first contact part 42 is inclinedly extended with a first angle b from the axial direction a of the rotating roller 10 toward the bushing 20, and then the first contact part 42 is pressed by the external side of the bushing 20 so as to have a second angle c less than the first angle b with respect to the axial direction a when the bushing hole 20 is inserted into the bushing hole 32.

The first contact part 42 is placed in the bushing hole 32 between an external side of the main body 22 and the surface of the frame 30 in order to be pressed by and in contact with the main body 22 of the bushing 20. The first contact part 42 maintains the first angle b with respect to the axial direction a of the rotating roller 10 before the bushing 20 is inserted into the bushing hole 32. When the bushing 20 is inserted into the bushing hole 32, the bushing 20 is pressed to be displaced at the second angle c less than the first angle b by the external side of the main body 22. The first contact part 42 is displaced from the first angle b to the second angle c and then contacts the bushing 20.

As the first contact part 42 is pressed to be displaced from the first angle b to the second angle c by the bushing 20, the first contact part 42 accumulates an elastic energy and generates a restoring force to return to the first angle b. With such a restoring force, the first contact part 42 stably contacts the bushing 20.

An end part 44 of the first contact part 42 is bent toward the frame 30. The end part 44 of the first contact part 42 is extended toward the opposite direction to a direction in which the first contact part 42 is extended with respect to the radial direction, that is, along a direction in which the first contact part is extended at the first angle b with respect to the axial direction a of the rotating roller 10. Accordingly, as the bushing 20 is inserted into the bushing hole 32, and the first contact part 42 is displaced at the second angle c, the end part 44 of the first contact part 42 contacts the frame 30, and supports the first contact part 42 to be restored to the first angle b. Accordingly, a contact force and a contact area of the first contact part 42 with respect to the bushing 20 are increased. Also, the end part 44 of the first contact part 42 is separated from the bushing 20 so that a middle part 45 of the first contact part 42 contacts the bushing 20, thereby making the bushing 20 smoothly move inside the bushing hole 32 in the axial direction a in an assembling process. There is a gap between the main body 22 of the bushing 20 and the surface of the frame 30 in the radial direction, and the gap is greater than a thickness of the first contact part 42 of the ground member 40 such that a bent portion of the first contact part 42, end part 44, and the middle part 45 has a length greater than the gap in the radial direction.

The second contact part 46 is extended to the radial direction of the rotating roller 10 to be interposed between the frame 30 and the stopper 24 from the first contact part 42, and contacts with the stopper 24 to ground the bushing 20. A first side of the second contact part 46 is extended to the first contact part 42, and a second side of the second contact part 46 is interposed between the frame 30 and the stopper 24 to contact the stopper 24. The second contact part 46 gets static electricity directly from the stopper 24, or transmits the static electricity from the first contact part 42 to a grounding terminal (not shown).

The second contact part 46 is integrally formed with the first contact part 42. The first contact part 42 is bent from the second contact part 46 to have the first angle b before the bushing 20 is inserted into the bushing hole 32. Accordingly, when the bushing 20 is inserted into the bushing hole 32 and the first contact part 42 is pressedly deformed to have the second angle c, the first contact part 42 and the second part 46 store the restoring elastic energy, thereby generating the restoring force so that the first contact 42 has the first angle b. Alternatively, the first contact part 42 and the second contact 46 may be combined for the first contact part 42 to have the first angle b.

Hereinafter, an operation of the roller apparatus according to an embodiment of the present general inventive concept will be described by referring to FIG. 2 and FIG. 3.

FIG. 2 illustrates a state that the bushing 20 has been inserted into the bushing hole 32, and FIG. 3 illustrates a state that the bushing 20 is ready to be inserted into the bushing hole 32. As illustrated in FIGS. 2 and 3, before the bushing 20 is inserted into the bushing hole 32, the first contact part 42 is bent from the second contact part 46 to be extended in the axial direction a of the rotating roller 10 to have the first angle b, and is interposed between the main body 22 and the frame 30 (see "A" in FIGS. 2 and 3).

When the bushing 20 is inserted into the bushing hole 32, the first contact part 42 is pressed to the radial direction of the rotating roller 10 and is deformed to have the second angle c less than the first angle b with respect to the axial direction a (see "B" in FIG. 2). The second contact part 46 is interposed between the frame 30 and the stopper 24 to support the first contact part 42, and accumulates the elastic energy along with the first contact part 42. The first contact part 42 and the second contact part 46 stably contact the main body 22 and the stopper 24 by the restoring force, respectively. Accordingly, the contact force by which the grounding member 40 contacts with the bushing 20 and the contact area thereof can be improved.

In the roller apparatus 1 according to the present embodiment, the grounding member 40 has the second contact part 46, but other embodiments may not have the second contact part 46. It is possible that at least one of the first contact part 42, the middle part 45, and the end part 44 is connected to the ground terminal.

The grounding member 40 of the roller apparatus 1 according to the present general inventive concept may be formed of an elastic material, but may also be formed of a plastic material. Although the grounding part 40 of the plastic material is positioned between the bushing 20 and the frame 30 to contact the bushing 20 and is plastically deformed by pressure when the bushing 20 is inserted into the bushing hole 32, the contact force and the contact area with respect to the bushing 20 can be stably obtained.

The rotating roller 10 of the roller apparatus 1 according to the present general inventive concept may be a paper feeding roller which feeds a printing paper provided in an image forming apparatus, a developer feeding roller which feeds a developer, or a photosensitive drum forming an electrostatic latent image. The rotating roller 10 is not limited thereto, but may be a general roller.

As described above, according to the present general inventive concept, the roller apparatus includes the grounding member 40 interposed between the bushing 20 and the frame 30 and includes the grounding member 40 to contact the bushing 20 by being elastically deformed by pressure of the bushing 20 to increase the contact area with respect to the bushing 20, and to improve contact stability, thereby effectively grounding the bushing 20. The grounding member 40 has an electrical connection with the bushing 20. Accordingly, damage and malfunction of the apparatus by static electricity generated by friction between the bushing and the roller can be prevented and the molding can be simplified.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A roller apparatus comprising:
   a rotating roller;
   a bushing to frictionally support the rotating roller;
   a frame having a bushing hole into which the bushing is inserted and to support the bushing; and
   a grounding member disposed in the bushing hole to ground the bushing by press-contacting the bushing when the bushing is inserted into the bushing hole.

2. The roller apparatus according to claim 1, wherein the grounding member comprises a first contact part inclinedly extended in the bushing hole with a first angle with respect to an axial direction of the rotating roller toward the bushing and pressed by an external side of the bushing to have a second angle less than the first angle with respect to the axial direction when the bushing is inserted into the bushing hole.

3. The roller apparatus according to claim 2, wherein:
   the bushing comprises a main body to support the rotating roller, and a stopper extended from one side of the main body in a radial direction of the bushing;
   the first contact part to press-contact the main body; and
   the grounding member comprises a second contact part which is extended from the first contact part in the radial direction of the rotating roller to be interposed between the frame and the stopper and grounds the bushing by contacting the stopper.

4. The roller apparatus according to claim 2, wherein the grounding member comprises an end part extended from the first contact part to be bent toward the frame.

5. The roller apparatus according to claim 4, wherein:
   the bushing comprises a main body to support the rotating roller, and a stopper extended from one side of the main body in a radial direction of the rotating roller;
   the first contact part to press-contact the main body; and
   the grounding member comprises a second contact part which is extended from the first contact part in the radial direction of the rotating roller to be interposed between the frame and the stopper and grounds the bushing by contacting the stopper.

6. The roller apparatus according to claim 1, wherein the grounding member comprises an elastic material.

7. A roller apparatus, comprising:
- a rotating roller;
- a frame having a surface to define a hole to accommodate the rotating roller;
- a bushing to be inserted around the rotating roller and to be inserted in the hole, and having a gap with the surface of the frame in a radial direction of the rotating roller; and
- a grounding member disposed in the gap between the frame and the bushing to ground the bushing to an external ground.

8. The roller apparatus of claim 7, wherein the gap is greater than a thickness of the grounding member in the radial direction.

9. The roller apparatus of claim 7, wherein the grounding member comprises a shape varying according to a state where the bushing is inserted into the hole of the frame.

10. The roller apparatus of claim 7, wherein the grounding member comprises a first shape before the bushing is inserted into the hole, and a second shape after the bushing is inserted into the hole.

11. The roller apparatus of claim 10, wherein the first shape has a thickness in the radial direction greater than the gap.

12. The roller apparatus of claim 11, wherein the second shape has a second thickness in the radial direction substantially the same as the gap.

13. The roller apparatus of claim 7, wherein the grounding member is movable according to a position of the bushing with respect to the frame.

14. The roller apparatus of claim 7, wherein the grounding member is deformable according to a movement of the bushing with respect to the frame.

15. The roller apparatus of claim 7, wherein the gap is defined by an inner diameter of the hole and an outer diameter of the bushing and the grounding member has a thickness thinner than the gap in the radial direction.

16. The roller apparatus of claim 7, wherein:
- the frame having a second surface facing a portion of the bushing to form a second gap in an axial direction of the rotating roller; and
- the grounding member comprises a portion disposed in the second gap.

17. The roller apparatus of claim 16, wherein the grounding member is deformable, and the portion of the grounding member is not deformable.

18. The roller apparatus of claim 7, wherein the grounding member comprises:
- a first contact part;
- a free end part; and
- a middle part disposed between the first contact part and the free end part to be bent toward the bushing to contact the bushing to ground the bushing.

19. The roller apparatus of claim 18, wherein the free end part is movable to be attached to and detached from the surface of the frame according to a movement of the middle part.

20. An image forming apparatus, comprising:
- a rotating roller;
- a frame having a surface to define a hole in which the rotating roller rotates;
- a bushing inserted in the hole between the rotating roller and the surface of the frame to be stationary with respect to the frame to support the rotating roller; and
- a grounding member having a variable shape disposed in a gap between the bushing and the surface of the frame in a radial direction of the rotating roller.

21. A roller apparatus, comprising:
- a rotating roller;
- a frame having a surface to define a hole to accommodate the rotating roller;
- a bushing inserted in the hole; and
- a grounding member primarily disposed in contact with two substantially perpendicular surfaces of the bushing to ground the bushing to an external ground.

22. An image forming apparatus, comprising;
- a rotating roller;
- a frame having a frame surface with a surface area to define a hole to accommodate the rotating roller;
- a bushing to be inserted in the hole; and
- a grounding member positioned to contact most of the surface area of the frame surface to ground the bushing to an external ground.

* * * * *